(12) United States Patent
Pantelleria et al.

(10) Patent No.: US 6,655,554 B2
(45) Date of Patent: Dec. 2, 2003

(54) WIDE PATTERN LAMINATED END DISK FOR FOOD DISPENSING GUN AND CARTRIDGE FOR IMPLEMENTING SAME

(75) Inventors: Joseph A. Pantelleria, Overland Park, KS (US); George E. MacEwen, Kansas City, MO (US)

(73) Assignee: Huhtamaki Consumer Packing, Inc., DeSoto, KS (US)

( * ) Notice: Subject to any disclaimer, the term of this patent is extended or adjusted under 35 U.S.C. 154(b) by 13 days.

(21) Appl. No.: 10/044,591

(22) Filed: Jan. 11, 2002

(65) Prior Publication Data

US 2003/0132253 A1 Jul. 17, 2003

(51) Int. Cl.$^7$ ............................................... B65D 88/54
(52) U.S. Cl. ................. 222/327; 222/386; 222/387; 222/391; 222/490
(58) Field of Search ................... 222/326, 327, 222/391, 490, 491, 494, 212; 220/359.2; 215/232; 229/93; 137/845, 849

(56) References Cited

U.S. PATENT DOCUMENTS

| | | | | |
|---|---|---|---|---|
| 1,122,868 A | * | 12/1914 | Davis ........................... 222/490 |
| 3,884,396 A | * | 5/1975 | Gordon et al. ............... 222/327 |
| 4,356,935 A | * | 11/1982 | Kamin ........................... 222/1 |
| 4,373,646 A | * | 2/1983 | MacEwen ..................... 222/327 |
| 4,432,473 A | * | 2/1984 | MacEwen ..................... 222/327 |
| 4,505,770 A | * | 3/1985 | Larimore ...................... 156/235 |
| 4,830,231 A | * | 5/1989 | Smith ........................... 222/327 |
| 4,850,731 A | * | 7/1989 | Youngs .................... 206/308.1 |
| 5,384,174 A | * | 1/1995 | Ward et al. ................. 428/41.5 |
| 5,607,056 A | * | 3/1997 | Whiteside .................... 206/427 |
| 6,176,399 B1 | * | 1/2001 | Schantz et al. ............. 222/484 |

* cited by examiner

Primary Examiner—Gene Mancene
Assistant Examiner—F. Nicholas
(74) Attorney, Agent, or Firm—Shook, Hardy & Bacon L.L.P.

(57) ABSTRACT

A laminated end disk construction for food sauce dispensing cartridges and other food containers. A laminated end disk through which food sauce may be dispensed is provided with a valve layer and a support layer. The valve layer includes a plurality of valves, and the support layer includes one or more openings and a kiss cut defining an outer perimeter area and an inner area. A protective patch may be removably attached to the support layer along at least a portion of the outer perimeter. The invention also provides a laminated end disk wherein the ratio of the support area to the dispensing area is less than about 7.

16 Claims, 8 Drawing Sheets

WIDE PATTERN LAMINATED END DISK FOR FOOD DISPENSING GUN AND CARTRIDGE FOR IMPLEMENTING SAME

FIELD OF THE INVENTION

This invention relates generally to the dispensing of food sauces and other foods and more particularly to an improved laminated end disk construction for food dispensing cartridges.

BACKGROUND OF THE INVENTION

Fast service restaurants and other food service facilities use various types of food sauces that are applied to sandwiches and other foods. Due to the large volume of customers that are served by fast service restaurant chains, the sauces must be dispensed repeatedly in carefully controlled portions each containing a relatively small amount of sauce. Particularly in applications of this type, it has proven to be convenient for the sauces to be packaged in cartridge dispensers from which the sauce is dispensed using handheld dispensing guns. The amount of sauce that is dispensed is controlled by providing suitable valving in the dispensing end of the cartridge and using a dispensing gun that advances a plug in the cartridge a consistent distance each time the dispensing gun trigger is squeezed.

Examples of the types of dispensing cartridges that have been used are described in U.S. Pat. Nos. 4,432,473 to MacEwen and 4,830,231 to Smith, which are incorporated herein by reference. Although cartridges of this type have functioned well for the most part, there is room for improvement, particularly with respect to the construction of the dispensing end disk. An example of a folded end construction for securing an end disk to a dispensing cartridge is described in pending U.S. patent application Ser. No. 09/732,065, which is incorporated herein by reference.

Referring to FIG. 1, numeral 10 generally designates a conventional food sauce dispensing cartridge. Food sauce 12 is packaged in the cartridge 10 and is dispensed in measured quantities from the cartridge by a handheld dispensing gun 14. The dispensing gun 14 has a pair of flanged plates 16 between which the cartridge 10 is held. The dispensing gun 14 has a handle 18 and a trigger 20 which may be squeezed to operate the dispensing gun. One or more pawls 22 are connected with the trigger 20 and act against a ratchet 24 when the trigger 20 is squeezed. The ratchet 24 takes the form of a bar which carries a plunger 26 on one end. Each time the trigger 20 is squeezed, the interaction between the pawl 22 and the ratchet 24 advances the plunger 26 into the cartridge 10 a predetermined distance in order to dispense the food sauce 12. The construction and operation of the dispensing gun 14 is described in more detail in U.S. Pat. No. 4,432,473 to which reference may be made for a thorough description of the dispensing gun.

The dispensing cartridge 10 has a body 28 which is formed by a cylindrical side wall 30. The side wall 30 is preferably a foil laminated food grade paperboard that is coated on both its inside and outside surfaces with thermoplastic (not shown), preferably polyethylene. The body 28 may be formed by rolling the paperboard into the shape of a cylinder and providing an overlap or seam area (not shown) which is suitably secured to form a leakproof container.

One end of the cartridge body 28 is provided with a plug 32 which closes the end of the cartridge and may be advanced into the cartridge body toward the opposite end when the plunger 26 of the dispensing gun is advanced against the plug 32.

The opposite end of the cartridge body 28 is the end through which the sauce 12 is dispensed. The dispensing end is provided with an end disk 34 which may include a valve layer and a paperboard layer. Conventional end disks 34 include a single relatively small valve opening or outlet 36 through which the food sauce 12 is dispensed each time the plug 32 is advanced toward the end disk 34 by operation of the dispensing gun 14. The food sauce 12 is discharged through the outlet 36 in a precise amount that is dependent upon the distance the plug 32 advances when the dispensing gun is operated. The plunger 26 is advanced a consistent amount each time the trigger 20 is squeezed, so that the same amount of food sauce 12 is discharged through the outlet 36 each time the dispensing gun is operated.

As indicated above, conventional dispensing guns usually discharge food sauce through a single small outlet. Although this design works relatively well for applying sauces over food items having relatively small application areas, e.g., tacos, this design poses problems when applying sauce to items having larger application areas, such as hamburgers. Traditionally, an individual using a single-outlet dispensing gun on a hamburger would move the spout cap over the surface thereof while continuously or repeatedly squeezing the trigger. This method often results in an uneven application of sauce to the hamburger and creates a non-uniform taste profile. Thus, a need exists for a dispensing gun that can evenly distribute a sauce over a food item having a generally large application area Another problem associated with conventional dispensing guns is that the valves tend to rip or tear after repeated use or under high pressure conditions. For example, relatively high pressures may be necessary to dispense a highly viscous sauce such as cream cheese. If a valve in a dispensing cartridge rips or tears in mid-use, the cartridge is typically rendered useless and must be disposed of. Thus, a need also exists for a dispensing gun that can dispense highly viscous sauces without ripping or tearing its valves.

A conventional dispensing disk assembly includes a removable seal adapted to be applied over the paperboard layer to cover the valve opening and prevent the passage of the sauce in the container through the valve until it is desired to begin dispensing the sauce. Conventional seals were formed of plastic tape with an adhesive applied to one surface thereof or a metal foil, such as aluminum, coated on one surface with a pressure or heat-sensitive adhesive. However, in a conventional dispensing cartridge, removal of the seal often results in ripping or tearing of the paperboard layer or other outer layer, thereby decreasing the support properties of the paperboard layer. This decrease in the strength of the end disk may lead to structural failure of the dispensing disk upon use of the dispensing gun rendering the dispensing cartridge useless. Thus, a need exists for reducing or eliminating paperboard or other outer layer ripping or tearing resulting from the removal of the seal covering.

Additionally, the fast service restaurant industry is always looking to increase food preparation efficiency. However, because conventional dispensing guns have a single small outlet, a relatively considerable amount of time is required to apply sauces to food items having a generally large application area. Thus, a need also exists for a dispensing gun that can quickly distribute a sauce over a food item having a generally large application area.

Conventional single-outlet dispensing guns have worked relatively well on food items having a continuous application area. However, problems have arisen by attempting to use such dispensing guns on items having a discontinuous application area For example, it is desirable to avoid the center hole of a bagel when applying cream cheese or jelly thereto. Thus, a need exists for a food dispensing gun having a discontinuous application pattern which is specifically suited to a food item having a discontinuous application area such as a bagel.

SUMMARY OF THE INVENTION

The present invention is directed to a laminated end disk assembly for a dispensing cartridge used in a food dispensing gun. More specifically, the invention is characterized by a wide area end disk for evenly distributing food sauces over items having a large and/or discontinuous application area. The laminated end disk includes a valve layer and a support layer, wherein the valve layer includes a plurality of valves and the support layer includes a plurality of openings defining a dispensing area and a support area. The support layer may include a kiss cut defining an outer perimeter area and an inner area A patch is removably attached to the support layer along at least a portion of the outer perimeter area. The patch is also optionally attached to the support layer at one or more points located in the inner area. This construction reduces or eliminates ripping or tearing of the support layer often encountered when the patch is removed from a conventional end disk. The ratio of the support area to the dispensing area may be less than about 7, 6, 5, 4, 3 or 2.

The present invention also provides that the openings in the support layer may be oriented in a circular pattern with respect to one another. The circular pattern may be adapted for applying a sauce on a food item having a discontinuous application area such as a bagel. Additionally, the support layer may include a center opening which is adapted for applying a sauce on a food item having a relatively large continuous pattern such as a hamburger. The plurality of openings also provides for the even application of sauce to food items thereby providing a generally uniform taste profile across the entire application area.

In accordance with one embodiment of the present invention, each valve in the valve layer is associated with an opening in the support layer. This embodiment provides increased structural support for the valves. Thus, a wide area laminated end disk for dispensing sauce over a large area is obtainable while minimizing the ripping and tearing of valves associated with conventional dispensing disks. This embodiment is particularly beneficial for the dispensing of highly viscous sauces such as cream cheese.

As defined herein, "sauce" means any food item capable of being dispensed by a dispensing gun including, but not limited to, catsup, mustard, mayonnaise, sour cream, cream cheese, salad dressings, butter, margarine, jellies, cheeses, and flavoring sauces.

As defined herein, "dispensing area" means the total area circumscribed by the openings in the support layer.

As defined herein, "support area" means the total area of the support layer including the area circumscribed by the openings therein, minus the dispensing area.

DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
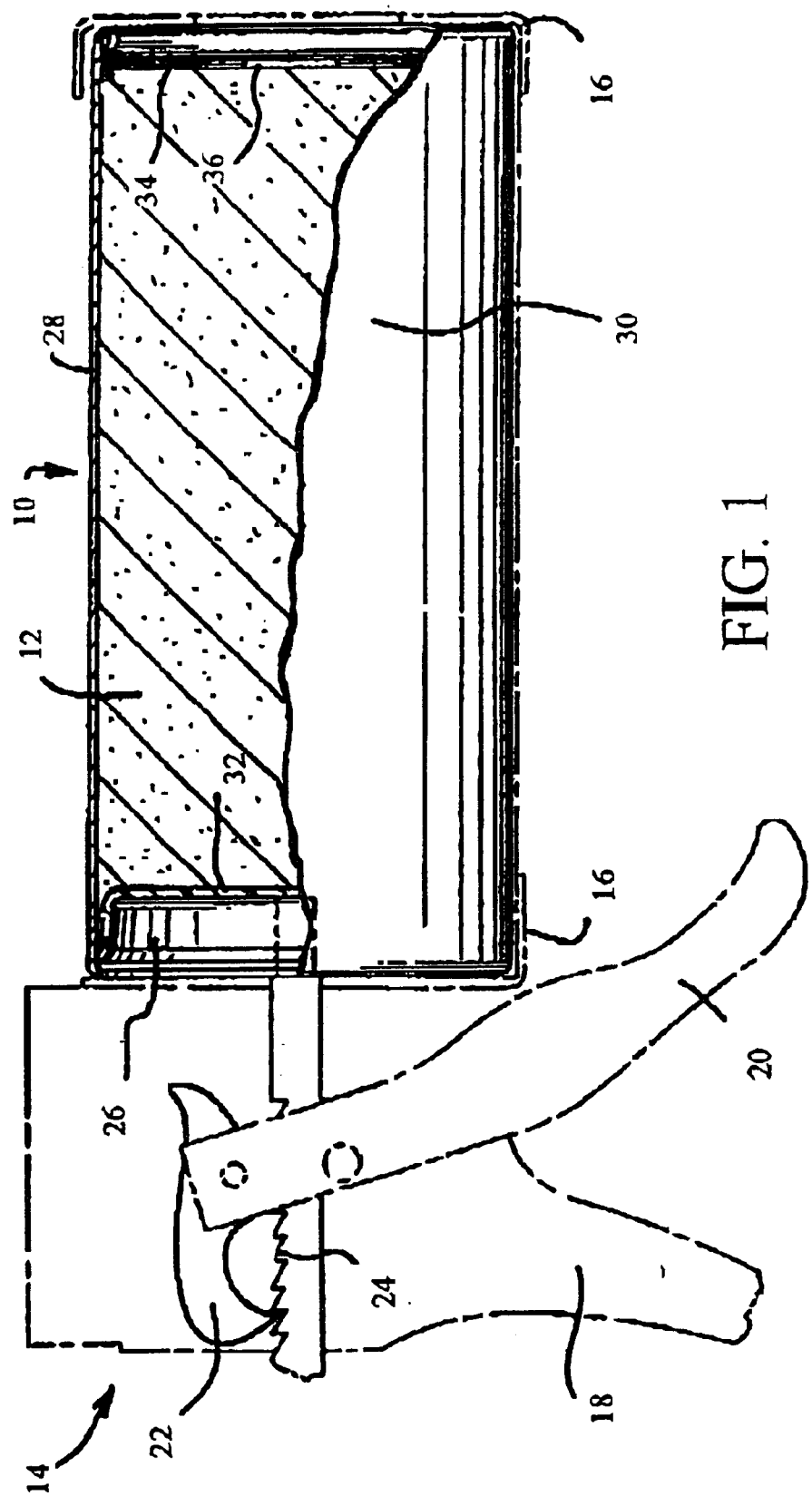
FIG. 1 is a side elevation view of a food sauce dispensing gun with a dispensing cartridge having a portion of the cartridge wall broken away for purposes of illustration.
Figure 2:
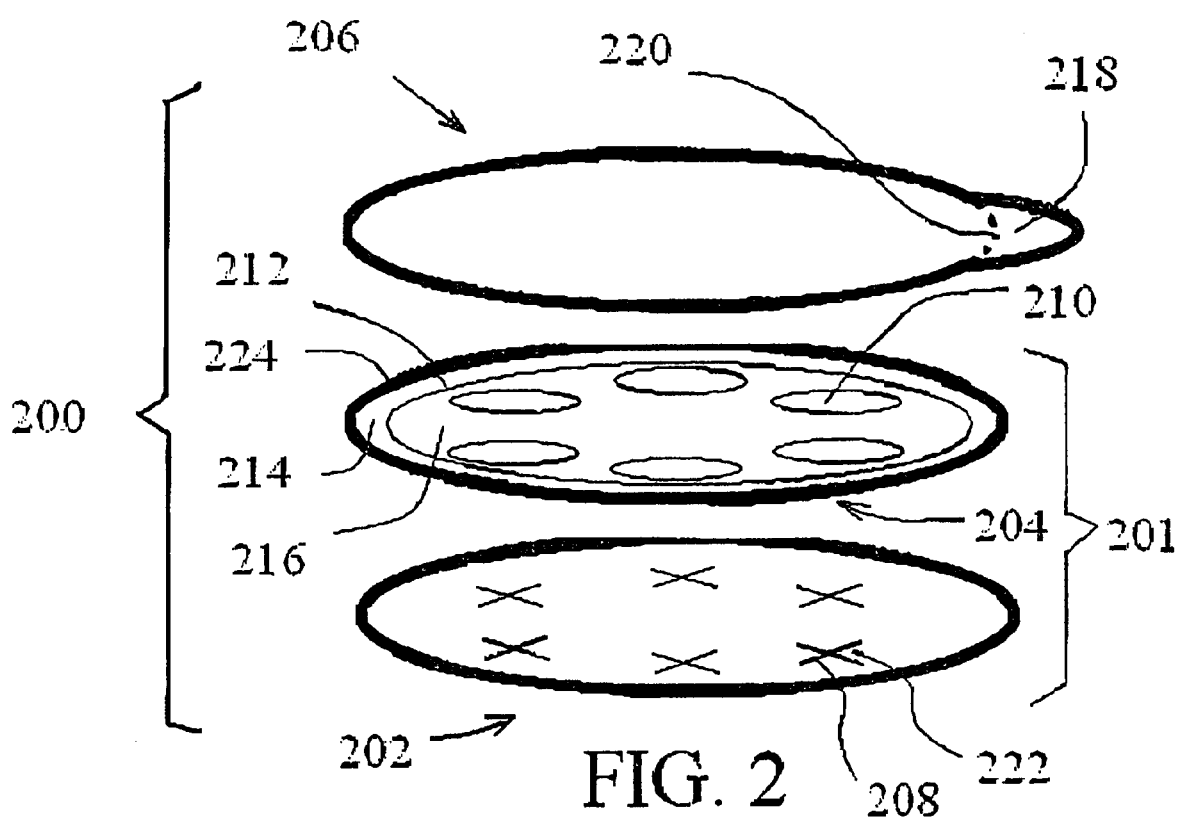
FIG. 2 is an exploded perspective view of a laminated end disk showing the valve layer, the support layer and the removable patch in accordance with one embodiment of the present invention.

Referring now to the drawings in more detail and initially to FIG. 2 in particular, numeral 200 generally designates a laminated end disk assembly for a food dispensing gun in accordance with a preferred embodiment of the present invention. The laminated end disk assembly 200 includes a laminated end disk 201 and a removable seal or patch 206. The laminated end disk 201 includes a valve layer, generally designated by numeral 202, and a support layer, generally designated by numeral 204.

Figure 3:
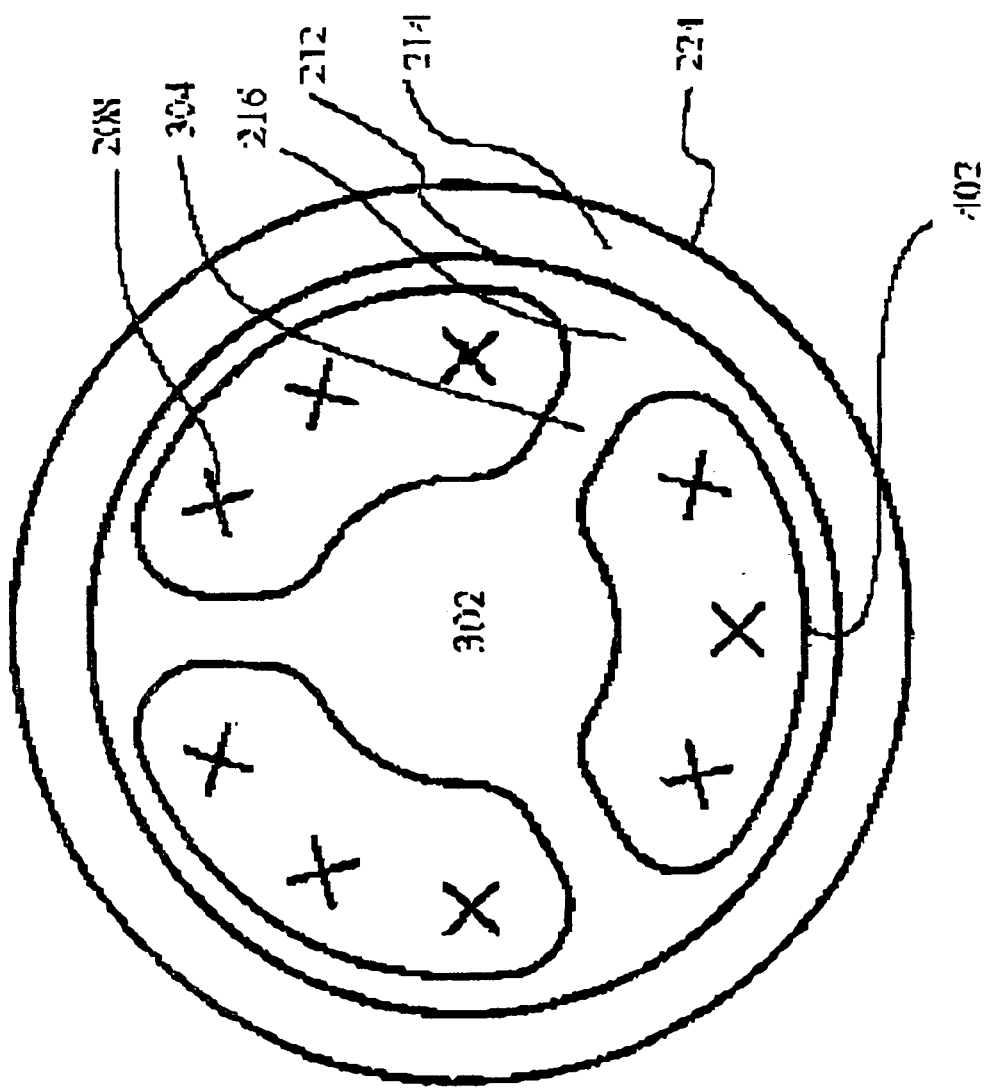
FIG. 3 is a front view of a laminated end disk showing a support layer having irregularly shaped openings in accordance with an alternative embodiment of the present invention.
Figure 4A:
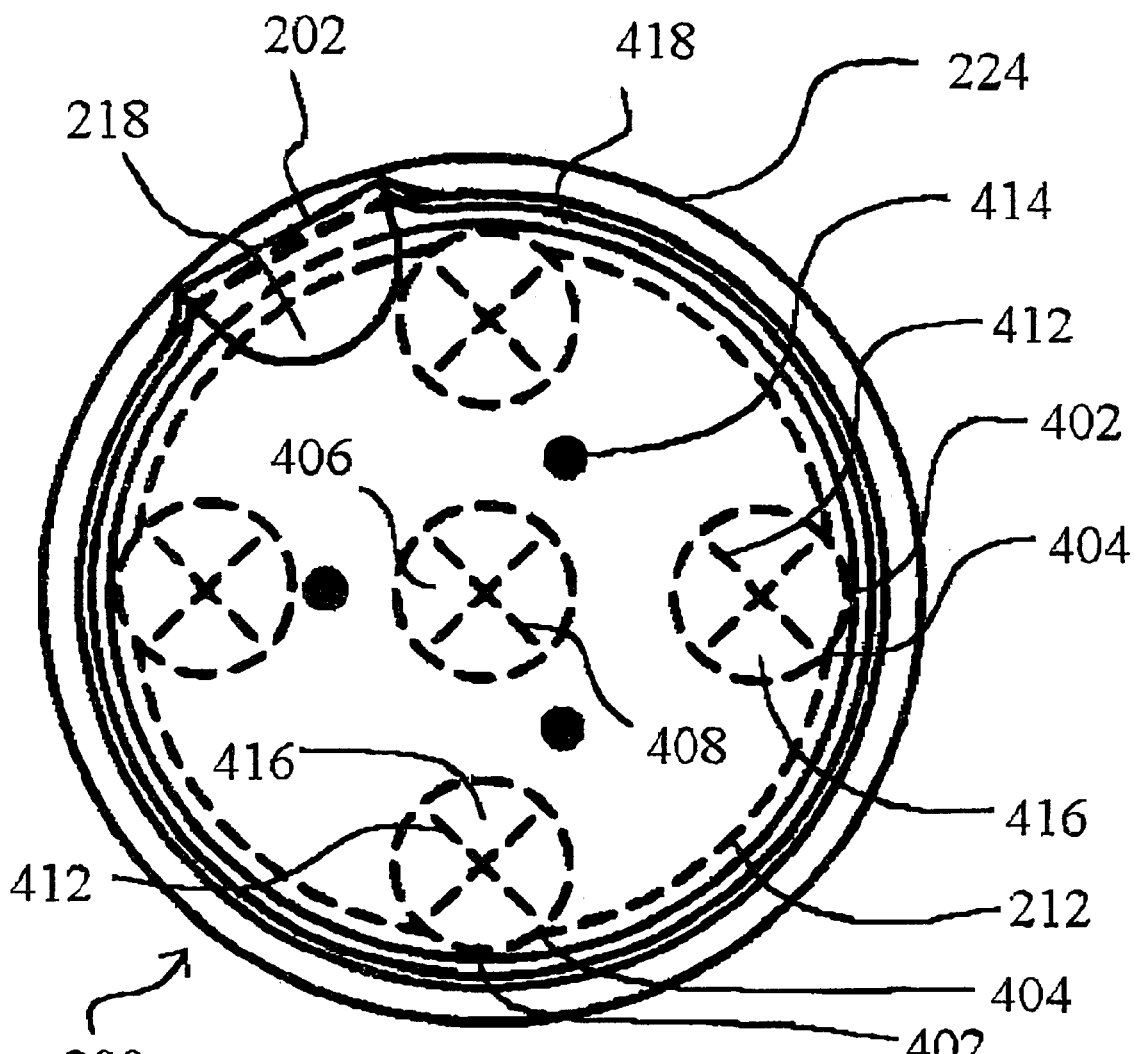
FIG. 4A is a front view of a laminated end disk assembly having four outer openings and a center opening with two-slit valves in accordance with an alternative embodiment of the present invention.
Figure 4B:
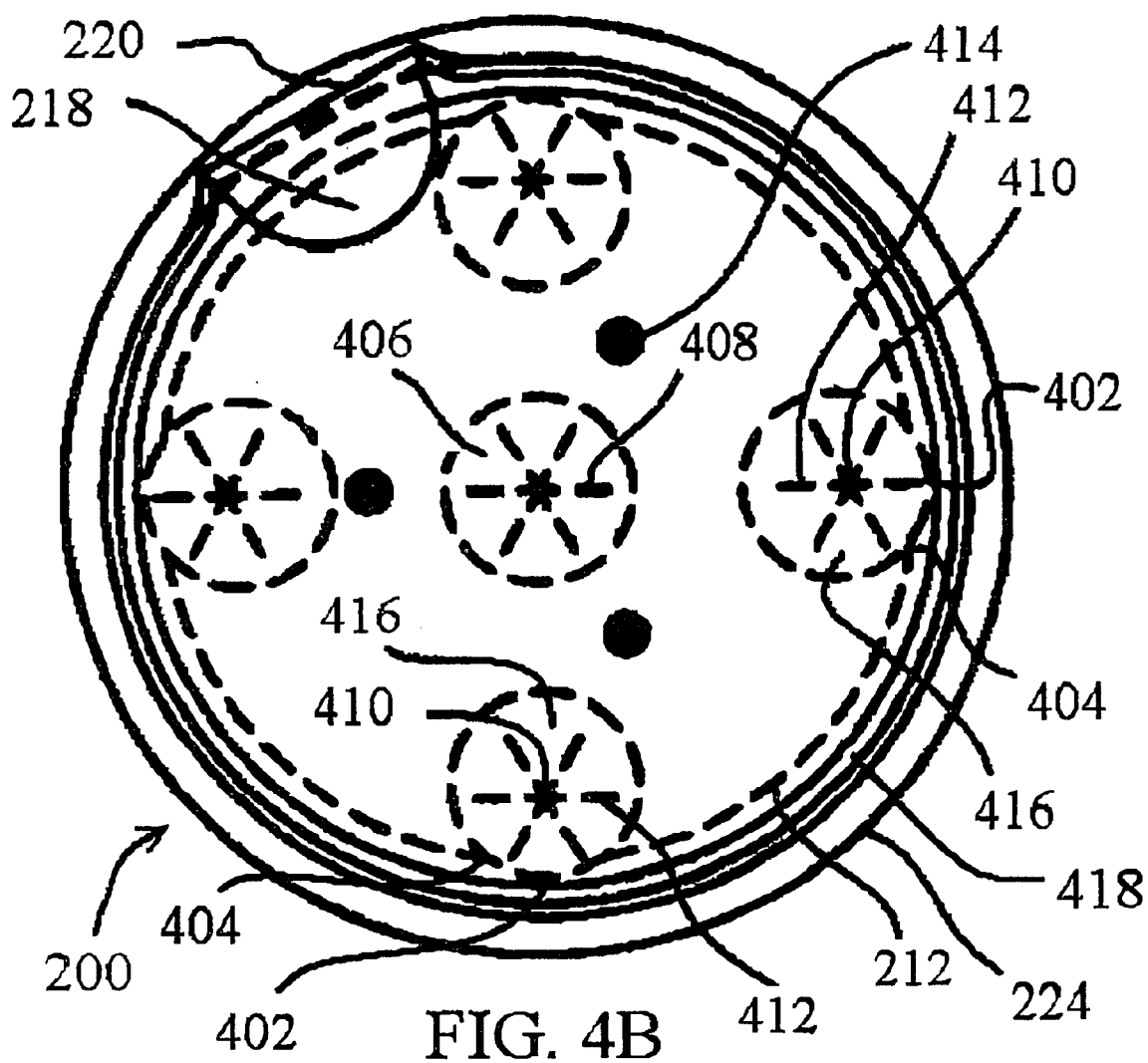
FIG. 4B is a front view of a laminated end disk assembly having four outer openings and a center opening with three-slit valves in accordance with an alternative embodiment of the present invention.

The valve layer 202 of the laminated end disk 201 is preferably formed of a polyester material having shape memory properties selected to suit the properties, e.g., viscosity, of the specific type of sauce intended to be dispensed by the food dispensing cartridge. The valve layer includes opposing inner and outer major planar surfaces and one or more dispensing valves 208 traversing the major planar surfaces, through which the sauce is dispensed., Each valve 208 is formed by two or more intersecting slits formed through the valve layer 202. The two or more slits are made in a cross hair pattern, preferably intersecting at their centers. The slits form a plurality of leaves or vanes 222 which are located between the slits and which taper to tip portions located adjacent to one another at the intersection between the slits. FIGS. 2, 3, 4A, 4C and 4D illustrate end disks having two-slit valves, while FIG. 4B illustrates an end disk having three-slit valves.

The petals or vanes 222 are part of the valve layer 202 and are normally coplanar with the remainder of the disk to close the valves 208. However, the vanes may be displaced outwardly from the closed position when internal pressure is generated in the dispenser cartridge due to the advancing plug 32. When the vanes 222 are thus displaced outwardly, the valves 208 are opened to allow the sauce to be dispensed through them. When the advancement of plug 32 is terminated at the end of each dispensing stroke, the "memory" or resiliency of the vanes 222 causes them to quickly return to their normal undeformed condition, and the valves 208 are thus quickly closed immediately following the end of each dispensing stroke.

Optionally, the inner major planar surface of the valve layer 202 may be covered or coated by a polyethylene layer (not shown) which protects the valve layer and prevents it from being oil stained or subjected to other materials that could possibly damage the valve layer material. Because polyethylene is not compatible with polyester, the polyethylene layer is not typically extrusion laminated directly onto the valve layer formed of polyester. Instead, an adhesive may be utilized to secure the polyethylene layer to the valve layer.

Stiffness and rigidity are provided to the laminated end disk by support layer 204, which is preferably formed of a paperboard material, although any generally stiff and rigid material may be used. Preferably, the support layer 204 is formed of a food grade paperboard material which may, but need not, be laminated with foil. In accordance with the present invention, the support layer includes opposing inner and outer major planar surfaces and one or more holes or openings 210 passing through the opposing inner and outer major planar surfaces. The openings 210 are aligned with one or more valves 208 in the valve layer 202. More specifically, each opening 210 may be generally aligned with a valve 208 in underlying valve layer 202 as illustrated in FIG. 2.

Optionally, an individual opening in the support layer may be aligned with a plurality of valves. For example, FIG. 3 illustrates an embodiment of the present invention wherein the laminated end disk includes a support layer having non-circular elongated outer openings 306. Each outer opening 306 includes a plurality of valves 208. More specifically, FIG. 3 illustrates a support layer having three elongated outer openings 306, each of which includes three valves 208 in accordance with an alternative embodiment of the present invention. FIG. 3 further illustrates an embodiment having a plurality of ribs 304 and a center support area 302 to reduce the occurrence of ripping and/or tearing of the valves. This embodiment allows the dispensing of sauces over a very large discontinuous application area in a short period of time. The valve layer optionally may include a center valve (not shown) in the region of the center support area 302, and the support layer optionally may include a center opening (not shown) in the region of the center support area 302, in order to allow the dispensing of sauce over a very large continuous application area.

Figure 4C:
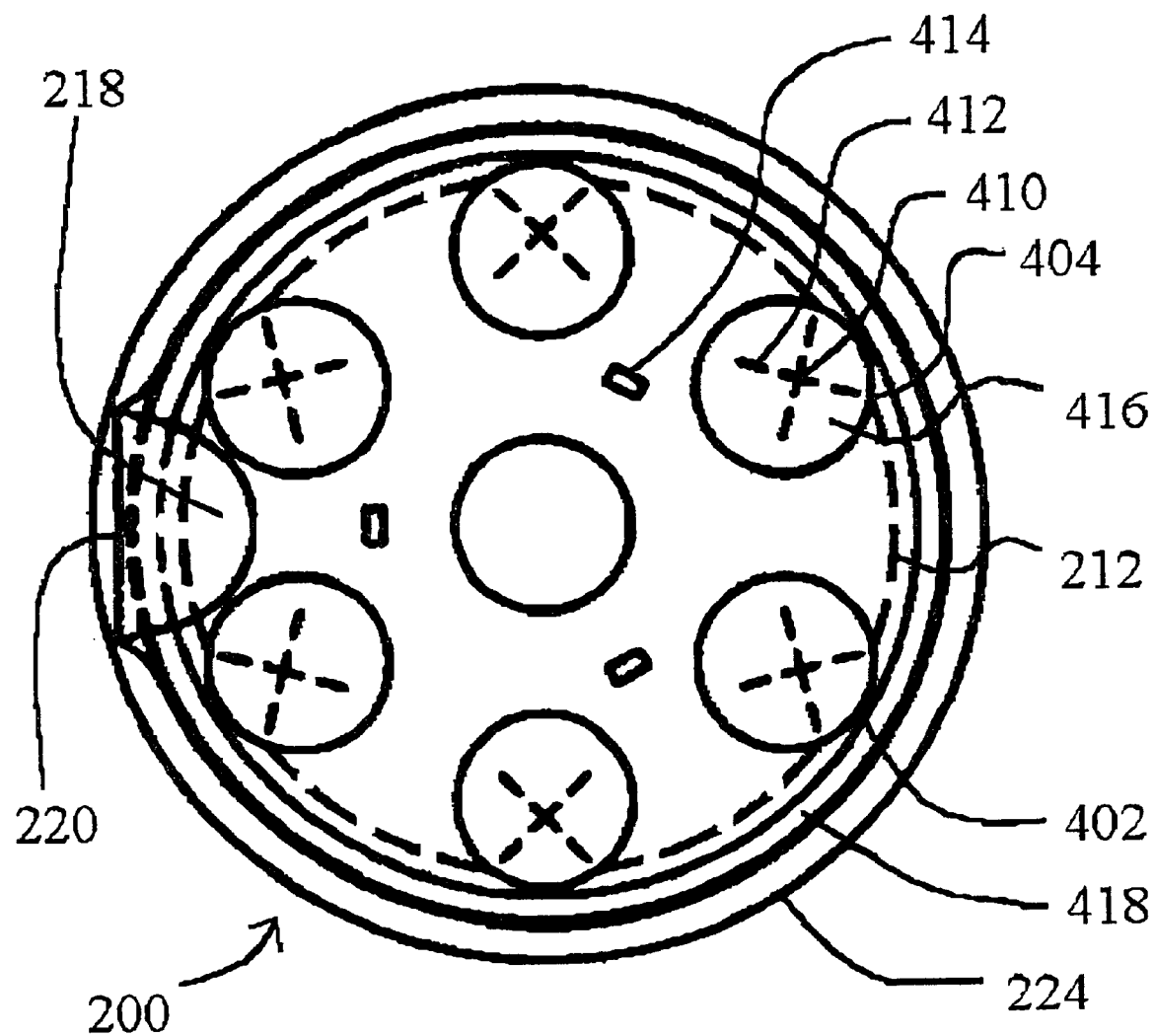
FIG. 4C is a front view of a laminated end disk assembly having six outer openings with two-slit valves in accordance with an alternative embodiment of the present invention.
Figure 4D:
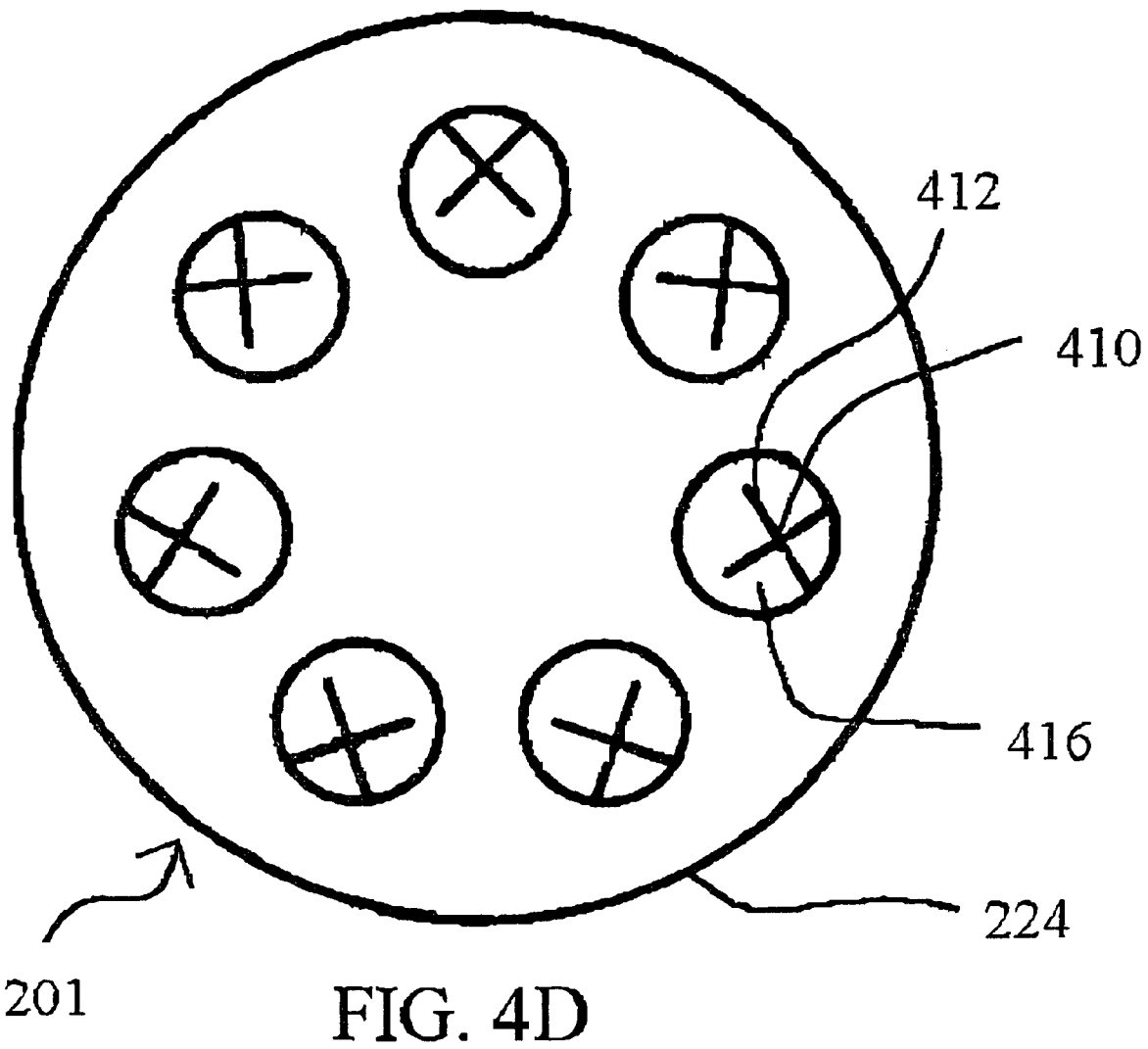
FIG. 4D is a front view of a laminated end disk having seven outer openings with two-slit valves in accordance with an alternative embodiment of the present invention.

A variety of valve and opening patterns may be implemented in accordance with the present invention. Preferably, the valve layer includes a plurality of outer valves as illustrated in FIGS. 4A–4D. In this embodiment, the support layer includes a plurality of outer openings generally aligned with the plurality of outer valves. Although the valves and openings should be generally aligned with one another, the intersecting point of the valve slits need not be coincident with the center point of the circle that defines the openings. In other words, valves and openings may be intentionally unaligned as illustrated in FIGS. 4B–4D, wherein the distance from intersection point 410 of slits 412 to outer edge 224 of the support layer is less than the distance from the center (not shown) of outer opening 416 to outer edge 224. In an alternative embodiment (not shown), the distance from intersection point 410 of slits 412 to outer edge 224 of the support layer may be more than the distance from the center of outer opening 416 to outer edge 224. The valve layer optionally may include a center valve 408, as illustrated in FIGS. 4A and 4B. In this embodiment, the support layer may include a center opening 406, as illustrated in FIGS. 4A and 4B.

In one embodiment, the outer openings are arranged in a circular arrangement with respect to one another as illustrated in FIGS. 2 and 4A–4D. Similarly, the outer valves are preferably oriented in a circular arrangement to one another. In accordance with the present invention, the dispensing disk includes a plurality of openings. Preferably, the dispensing disk includes four or more outer openings oriented in a circular arrangement. In alternative embodiments, the dispensing disk includes five or more, six or more, or seven or more outer openings oriented in a circular arrangement. The circular arrangement of the openings and valves provides a large dispensing area and results in the generally uniform application of sauces over a relatively large application area while maintaining good valve support characteristics. As shown in FIGS. 2 and 4A–4D, each valve in the valve layer may be specifically aligned and associated with an opening in the support layer. This embodiment provides for increased support for each valve, and allows the dispensing of highly viscous sauces while minimizing ripping and tearing of the valves. Additionally, the circular orientation of the valves and openings allows the quick application of sauces to food items having discontinuous application areas such as bagels. More specifically, the circular orientation of the valves and openings may be adapted to specifically coincide with the application area of a bagel or food item having a discontinuous application area. Each of these embodiments optionally may include a center opening. The center opening allows for a uniform application of sauces to a food item having a continuous relatively large application area, such as a hamburger.

The patch 206 is preferably formed of a foil material as described in U.S. Pat. No. 4,830,231 to Smith, which is incorporated herein by references. However, as the dispensing area of the present invention is much larger than the dispensing area of conventional end disks, the patch 206 is preferably formed having a large diameter. For example, the patch may have a diameter slightly less than, equal to, or greater than the diameter of the underlying support layer. Because the patch 206 in accordance with the present invention has a larger area than conventional patches, it is desirable that the patch include a pull tab 218 coupled to or integral therewith. The pull tab 218 preferably extends beyond the outer edge 224 of the underlying support layer as shown in FIG. 2. However, the pull tab 218 may be foldable about a fold line 220, as illustrated in FIGS. 4A–4C, in order to minimize accidental removal of the patch 206 from the laminated end disk 201.

The patch 206 or support layer may be provided with a heat seal, pressure sensitive coating, or other adhesive on its inner major planar surface. The heat seal or pressure sensitive coating adheres to the outer surface of the support layer (or to the polyethylene layer attached thereto) in order to cover the valves 208 and openings 210. The patch 206 is releasably attached to the support layer and can thus be removed when the dispensing cartridge is to be used. When the patch is removed, the valves 208 and openings 210 are exposed so that the sauce 12 may be dispensed therefrom. The placement of the adhesive coating on the support layer and/or patch will be described in more detail below.

Optionally, the support layer 204 includes a kiss cut 212 on its outer major planar surface. The kiss cut is a scoring or partial cut which penetrates the outer major planar surface of the support layer 204, but which does not traverse the support layer to the inner major planar surface thereof. The kiss cut .212 is preferably oriented concentrically to outer edge 224 of the support layer 204 thereby defining an inner area 216 and an outer perimeter area 214, although the kiss cut 212 may be oriented in a variety of non-circular patterns depending on the specific orientation of the openings in support layer 214.

In one embodiment, illustrated in FIGS. 4A–4D, there are several individual kiss cuts 212, each end of which terminates at edge points 404 of outer openings 416. The kiss cuts preferably connect to the outer openings 416 at edge points 404 positioned along the edges of the outer openings. Preferably, the distance from each edge point 404 to the outer edge 224 is greater than the distance of the outer-most points 402 of the outer openings to the outer edge 224. As a result, the distance from outer-most points 402 to outer edge 224 is less than the distance from the kiss cuts 212 to the outer edge 224. In this embodiment, the kiss cuts 212 are preferably oriented nearly tangent to outer-most points 402 of outer openings 416. This embodiment provides a wide dispensing area for a dispensing disk while maintaining an attachment area, e.g., outer perimeter area 214, for attaching patch 206 to support layer 204 in order to cover openings 210.

In an alternative embodiment (not shown), a single kiss cut may meet at the outer-most points of the outer openings such that the kiss cut is oriented tangent to the outer openings. In this embodiment, the distance from the kiss cut to the outer edge is the same as the distance from the outer-most points to the outer edge. In another embodiment, illustrated in FIGS. 2 and 3, there is a single kiss cut 212 which is oriented closer to outer edge 224 than the outer-most points of openings 210.

As indicated above, the kiss cuts 212 provide a hot melt or adhesive application area, e.g., the outer perimeter area 214, for the attachment of patch 206 to support layer 204 (or to the polyethylene layer attached thereto). Specifically, in accordance with the present invention, hot melt or an adhesive is applied within the outer perimeter area 214 of the outer major planar surface of support layer 204. Additionally or alternatively, the hot melt or adhesive may be applied to the portion of the inner major planar surface of the patch 206 which faces the outer perimeter area 214 of the outer major planar surface of support layer 204. The adhesive may be applied to fill the entire outer perimeter area 214 or a portion thereof, as illustrated by outer adhesion area 418 in FIGS. 4A–4C. When hot melt or an adhesive is applied to the patch and/or support layer having a kiss cut, the hot melt or adhesive will remain localized to the perimeter area 214 and will not migrate to the inner area 216. In this manner, the kiss cut minimizes "paper pull" across the major planar surface of the support layer. As a result, ripping and tearing of the outer major planar surface of the support layer as the patch is removed therefrom can be reduced or eliminated in accordance with the present invention.

Figure 5:
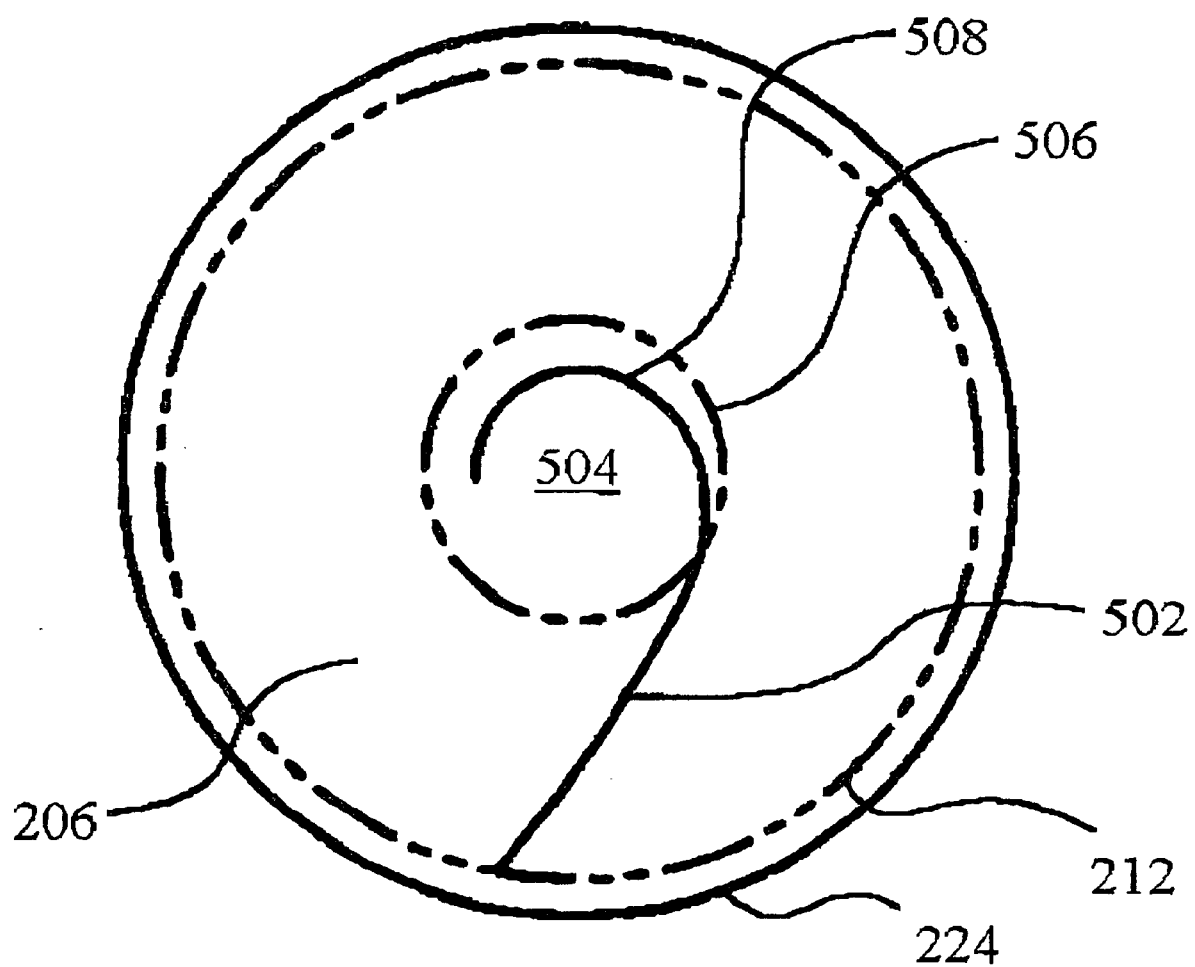
FIG. 5 is a front view of a removable patch in accordance with an alternative embodiment of the present invention.

FIG. 5 illustrates an alternative embodiment of the patch in accordance with the present invention. In this embodiment, patch 206 includes a generally spiral scoring or partial cut 502 extending from kiss cut 212 to a center area 504 illustrated in FIG. 5 by phantom line 506. The scoring or partial cut 502 may extend to the outer edge of the patch which may coincide with the outer edge 224 of the underlying support layer. This embodiment is preferably implemented in laminated end disks including a center opening and valve as shown in FIGS. 4A and 4B. Thus, phantom line 506 may coincide with a center opening in the underlying support layer thereby defining center area 504. To remove the patch, an individual pulls on peal edge 508 and pulls off the patch in a spiral manner. Alternatively, an individual may exert pressure against the center area 504 with a finger or implement thereby slightly penetrating the patch 206. The individual may then grasp the pull edge 508 and pull the patch from the support layer in a spiral manner.

Depending on the type of sauce to be used in the dispensing cartridge and the valve/opening orientation, an undesirable pocket may be formed within the opening in the support layer, between the patch and the valve layer, and/or between the patch and the support layer. Sauce may leak through the valves and become trapped within the pocket after the dispensing cartridge has been filled with sauce but prior to the time that the cartridge is ready for use. This leakage of sauce into the pocket area results in patch sagging. To reduce the problems associated with pocket formation and patch sagging, the patch 206 optionally may also be attached to the support layer 204 (or to the polyethylene layer attached thereto) at one or more discrete inner adhesion points 414 provided on inner area 216. Preferably, the patch is removably secured to support layer at three inner adhesion points 414, as shown in FIGS. 4A–4C. Each adhesion point 414 preferably is formed of a spot heat seal, a pressure sensitive coating, or other adhesive, applied toward the center of the support layer. The adhesion point 414 reduces or eliminates pocket formation and patch sagging. Additionally or alternatively, the spot heat seal, pressure sensitive coating, or other adhesive, which forms inner adhesion point 414 may be applied to an area of the patch which, when attached to the support layer, is aligned with the inner area 216 thereof.

A layer of suitable adhesive is used to secure the outer major planar surface of the valve layer 202 to the inner major planar surface of the support layer 204. The adhesive can be either a cold set glue, a heat seal coating, or other adhesive and it may be applied to support layer 204, valve layer 202, or both. The valve layer and support layer are preferably of generally equal diameter.

Optionally, the outer major planar surface of the support layer may be covered or coated by a polyethylene layer (not shown) which protects the support layer and prevents it from being oil stained or subjected to other materials that could possibly damage the paperboard or other material. The polyethylene layer also provides an outer surface which is heat sealable in order to receive a sealing patch 206. Heat sealing extrusion lamination, adhesive securement or any other suitable means may be used to secure support layer 204 to the polyethylene layer.

As indicated above, the present invention provides for the widest possible dispensing area of sauces with a dispensing gun. This aspect of the present invention may be easily defined by comparing the support area to the dispensing area as a ratio. Reiterating from above, "dispensing area" is defined herein to mean the total area circumscribed by the openings in the support layer. "Support area" is defined herein to mean the total area of the support layer including the area circumscribed by the openings therein, minus-the dispensing area Thus, as the dispensing area increases, the support area to dispensing area ratio decreases.

As an example, a hypothetical circular laminated end disk having a support layer with a radius of 4.3 cm would have a total area of 58 cm$^2$. If the support layer includes a single opening having a radius of 1.0 cm, then the disk would have a dispensing area of 3.1 cm. In this example, the support area would be 58 cm$^2$–3.1 cm$^2$=55 cm$^2$. Thus, the ratio of the support area to the dispensing area would be (55 cm$^2$/3.1 cm$^2$)=18.

The present invention provides the ability to have a very high dispensing area and a low support area. Thus, very low support area to dispensing area ratios may be obtained in accordance with the present invention. Ratios of less than about 7 are easily obtainable in accordance with the present invention. Further, ratios of less than about 6, less than about 5, less than about 4, less than about 3 and less than about 2 may be obtained in accordance with the present invention by increasing the size of the openings and, optionally, the size of the slits forming the valves.

Although the invention has been described in connection with an end disk construction for a sauce dispensing cartridge, it has utility in other applications involving the packaging and dispensing of foods.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having thus described the invention, what is claimed is:

1. A laminated end disk assembly for a sauce dispensing cartridge, comprising:
   a valve layer including a plurality of valves;
   a support layer attached to the valve layer and including one or more openings and a kiss cut defining an outer perimeter area and an inner area; and
   a patch removably attached to the support layer along at least a portion of the outer perimeter area.

2. The laminated end disk assembly of claim 1, wherein the patch is removably attached to the inner area of the support layer.

3. The laminated end disk assembly of claim 1, wherein the patch includes a tab which is extendable beyond the total area of the support layer.

4. The laminated end disk assembly of claim 1, wherein the support layer includes a plurality of openings disposed in a circular orientation and defining a center area.

5. The laminated end disk assembly of claim 4, wherein the support layer includes a center opening disposed in the center area.

6. The laminated end disk assembly of claim 4, wherein the circular orientation is adapted to apply a food item on a bagel.

7. The laminated end disk assembly of claim 4, wherein the patch includes an outer edge and a scoring extending in a spiral pattern from the outer edge to the center area.

8. The laminated end disk assembly of claim 7, wherein the scoring extends from the kiss cut to the center area.

9. The laminated end disk assembly of claim 4, wherein the plurality of openings disposed in the circular orientation includes exactly three openings.

10. The laminated end disk assembly of claim 4, wherein the plurality of openings disposed in the circular orientation includes exactly four openings.

11. The laminated end disk assembly of claim 4, wherein the plurality of openings disposed in the circular orientation includes exactly five openings.

12. The laminated end disk assembly of claim 4, wherein the plurality of openings disposed in the circular orientation includes exactly six openings.

13. The laminated end disk assembly of claim 4, wherein the plurality of openings disposed in the circular orientation includes seven or more openings.

14. A cartridge for holding and dispensing food sauce, comprising:
   a generally cylindrical body having opposite first and second ends and an interior for holding food sauce;
   a plug in the body adjacent the first end thereof adapted to be advanced in the body toward the second end thereof to dispense the food sauce; and
   a laminated end disk adjacent the second end thereof comprising a valve layer and a support layer, wherein the valve layer includes a plurality of valves and the support layer includes inner and outer major planar surfaces, one or more openings extending between the inner and outer major planar surfaces, and a kiss cut traversing the outer major planar surface but not traversing the inner major planer surface, the kiss cut defining an outer perimeter area and an inner area.

15. The cartridge of claim 14, further comprising: a patch removably attached to the support layer along at least a portion of the outer perimeter area.

16. The cartridge of claim 15, wherein the patch is removably attached to the support layer at one or more points in the inner area.

* * * * *